J. S. SWANEY.
Seedlings Puller.
No. 168,427.
Patented Oct. 5, 1875.
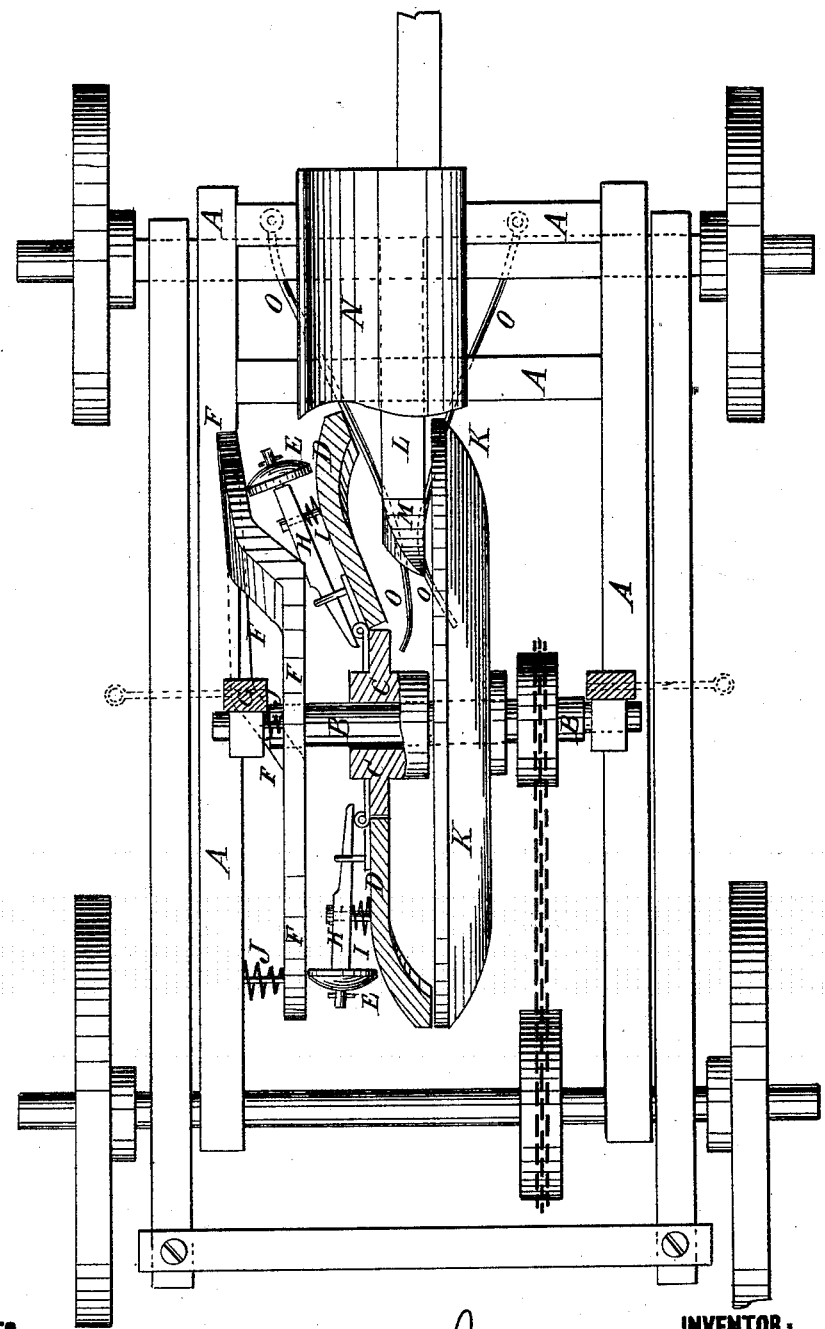

UNITED STATES PATENT OFFICE.

JOHN S. SWANEY, OF MARENGO, IOWA.

IMPROVEMENT IN SEEDLINGS-PULLERS.

Specification forming part of Letters Patent No. 168,427, dated October 5, 1875; application filed July 17, 1875.

*To all whom it may concern:*

Be it known that I, JOHN S. SWANEY, of Marengo, in the county of Iowa and State of Iowa, have invented a new and useful Improvement in Seedlings-Pullers, of which the following is a specification:

The figure is a top view of my improved machine, partly in section, to show the construction.

The invention will first be described in connection with drawing, and then pointed out in the claim.

A represents the frame, to which the bearings for the pull-wheel shaft B are attached. To the shaft B, at one side of its center, is attached a polygonal hub, C, having eight, more or less, sides, to the faces of which are hinged an equal number of jaws, D, which are made in the form of sectors, and which together form a wheel. The sectors or jaws D are pressed forward by small wheels E, which bear against their outer sides and roll along a ring-shaped track, guide, or cam, F, which is connected with and supported by the side bar of the frame A and an upright, G, attached to said side bar. The sectors D and wheels E are allowed to move outward by an outward curve or offset formed in the forward part of the track F. The wheels E revolve upon the outer ends of arms H, the inner ends of which are inserted in keepers attached to the inner parts of the jaws D. The jaws D are held forward by springs I, interposed between them and the arms H, which allow the said jaws to yield to adjust themselves to the varying thickness of the stems of the plants to be pulled. J are springs interposed between the way F and its support to allow the jaws D to yield still further to adjust themselves to the thickness of the stems of the plants. The springs I J must be of such a strength as to press the jaws D forward with such force that they will grasp the plants with sufficient firmness to draw their roots from the ground. To the shaft B in front of the jaws D is secured a wheel, K, made solid or with arms or spokes, the inner side of which is concaved, so that the jaws D may press the plants against the inner side of its rim, to hold them while being drawn from the ground. To the front cross-bar of the frame A is attached a rearwardly-projecting bar, L, to the rear end of which is attached a wedge-shaped block, M, the pointed end of which, as the shaft B revolves, enters between the jaws D and the wheel K and forces the said jaws D outward to release the plants and allow them to fall upon the receiver N attached to the forward cross-bars of the frame A, whence they are removed and bound into bundles or dropped to the ground in bunches. To the lower side of the forward cross-bar of the frame A, near or toward its ends, are attached the forward ends of two guide-rods, O, which incline toward each other, and the rear ends of which enter the space between the jaws D and the wheel K, just below the opening-block M, and before the said jaws are pressed against the wheel K to grasp the plants. The rods O thus serve as guides to the plants and insure their properly entering the space between the said jaws and wheel and being grasped by them.

Having thus described my invention, I claim as new and desire to secure by Letters Patent—

The fixed wheel K, in combination with the shaft B, the polygonal hub C, and the hinged jaws D, substantially as herein shown and described.

JOHN S. SWANEY.

Witnesses:
A. J. MORRISON,
T. P. MURPHY.